US011604870B2

(12) United States Patent
Madden et al.

(10) Patent No.: US 11,604,870 B2
(45) Date of Patent: *Mar. 14, 2023

(54) SYSTEMS AND METHODS FOR AUTHENTICATION CODE ENTRY USING MOBILE ELECTRONIC DEVICES

(71) Applicant: VeriFone, Inc., San Jose, CA (US)

(72) Inventors: Chris Anthony Madden, Dublin (IE); Imran A. Hajimusa, San Jose, CA (US)

(73) Assignee: VeriFone, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 17/353,635

(22) Filed: Jun. 21, 2021

(65) Prior Publication Data

US 2021/0312036 A1    Oct. 7, 2021

Related U.S. Application Data

(62) Division of application No. 15/897,791, filed on Feb. 15, 2018, now Pat. No. 11,042,628.

(51) Int. Cl.
*G06Q 20/40* (2012.01)
*G06F 21/45* (2013.01)
(Continued)

(52) U.S. Cl.
CPC .............. *G06F 21/45* (2013.01); *G06F 21/31* (2013.01); *G06F 21/35* (2013.01); *G06F 21/606* (2013.01);
(Continued)

(58) Field of Classification Search
None
See application file for complete search history.

(56) References Cited

U.S. PATENT DOCUMENTS 9,342,673 B2 * 5/2016 Tungare ................. G06F 21/31
2003/0126453 A1   7/2003 Glew et al.
(Continued)

FOREIGN PATENT DOCUMENTS

EP     1 892 642 A1    2/2008

OTHER PUBLICATIONS

Alksnis, "Masked passwords, security questions, captcha and other unusable security", medium.com, 2014. (Year: 2014).*
(Continued)

*Primary Examiner* — Abdulmajeed Aziz
(74) *Attorney, Agent, or Firm* — Bond, Schoeneck & King, PLLC

(57) ABSTRACT

Systems and methods for authentication code entry using mobile electronic devices are disclosed. In one embodiment, in an information processing device comprising at least one computer processor, a display, and an input device a method for authentication code entry may include: (1) receiving, at the information processing device, a masking pattern for receiving entry of an authentication code, the masking pattern specifying an order for entering the authentication code; (2) presenting, on the display, a prompt to enter the authentication code in accordance with the masking pattern; (3) receiving, at the input device, a masked authentication code entry where the masked authentication code entry comprises the authentication code entered in accordance with the masking pattern; and (4) storing the masked authentication code entry.

15 Claims, 4 Drawing Sheets

(51) Int. Cl.
*G06F 21/35* (2013.01)
*G06F 21/60* (2013.01)
*G06Q 20/38* (2012.01)
*G06Q 20/32* (2012.01)
*H04L 12/06* (2006.01)
*G06F 21/31* (2013.01)
*G06F 21/62* (2013.01)

(52) U.S. Cl.
CPC ......... *G06Q 20/322* (2013.01); *G06Q 20/385* (2013.01); *H04L 12/06* (2013.01); *G06F 21/6245* (2013.01); *G06F 2221/2103* (2013.01); *G06Q 20/40* (2013.01); *G06Q 20/4012* (2013.01)

(56) References Cited

U.S. PATENT DOCUMENTS

| | | |
|---|---|---|
| 2004/0054929 A1 | 3/2004 | Serpa |
| 2010/0074477 A1 | 3/2010 | Fujii et al. |
| 2013/0097697 A1 | 4/2013 | Zhu et al. |
| 2014/0156535 A1* | 6/2014 | Jabbour .................. G06Q 20/34 705/72 |
| 2014/0195362 A1* | 7/2014 | Fisher .................. G06Q 20/382 705/21 |
| 2014/0351579 A1 | 11/2014 | Leggette et al. |
| 2015/0112872 A1* | 4/2015 | Sadiq .................. G06Q 20/409 705/72 |
| 2015/0278492 A1 | 10/2015 | Tungare |
| 2017/0046704 A1 | 2/2017 | Büchner et al. |
| 2017/0235954 A1* | 8/2017 | Kurupati ............. H04L 63/1458 726/23 |
| 2018/0300464 A1* | 10/2018 | Mahfouz ............... G06F 21/316 |

OTHER PUBLICATIONS

International Search Report, dated May 20, 2019, from corresponding International Application No. PCT/US2019/018186.
Written Opinion of the International Searching Authority, dated May 20, 2019, from corresponding International Application No. PCT/US2019/018186.
Alksnis, "Masked passwords, security questions, captcha and other unusable security", medium.com, 2014.
American Express, "Credit Card Point of Service Payment Authorization System" Journal of Engineering, p. 2118, Jun. 25, 2014.
European Search Report, EP Application No. 22167068.0, dated Jul. 21, 2022, pp. 1-9.

* cited by examiner

SYSTEMS AND METHODS FOR AUTHENTICATION CODE ENTRY USING MOBILE ELECTRONIC DEVICES

RELATED APPLICATIONS

This application is a Divisional of U.S. patent application Ser. No. 15/897,791, filed Feb. 15, 2018, now U.S. Pat. No. 11,042,628, entitled "SYSTEMS AND METHODS FOR AUTHENTICATION CODE ENTRY USING MOBILE ELECTRONIC DEVICES," the disclosure of which is hereby incorporated, by reference, in its entirety.

BACKGROUND OF THE INVENTION

1. Field of the Invention

The present disclosure relates generally to input devices, and more particularly to systems and methods for authentication code entry using mobile electronic devices.

2. Description of the Related Art

Mobile electronic devices, such as notebook/laptop computers, tablet computers, smart phones, etc. are often used by merchants in place of traditional point of sale devices. The merchant may execute a computer application on the mobile electronic device, and may swipe, read, or otherwise enter account information (e.g., a primary account number) from a transaction card (e.g., a credit card, debit card, etc.), and the cardholder may enter his or her authentication code (e.g., a PIN) using a touchscreen, keypad, or other entry device. The entry of the authentication code on the mobile electronic device, however, may not be secure; the application (or another application executed on the mobile electronic device) may capture the authentication code as it is entered and store it, along with the account information, for future playback.

SUMMARY OF THE INVENTION

Systems and methods for authentication code entry using mobile electronic devices are disclosed. In one embodiment, in an information processing device comprising at least one computer processor, a display, and an input device a method for authentication code entry may include: (1) receiving, at the information processing device, a masking pattern for receiving entry of an authentication code, the masking pattern specifying an order for entering the authentication code; (2) presenting, on the display, a prompt to enter the authentication code in accordance with the masking pattern; (3) receiving, at the input device, a masked authentication code entry where the masked authentication code entry comprises the authentication code entered in accordance with the masking pattern; and (4) storing the masked authentication code entry.

In one embodiment, the masking pattern may include a plurality of placeholders, and the order for entering the authentication code specifies a first subset of the plurality of placeholders that receive values of the authentication code and a second subset of the plurality of placeholders that receive dummy values.

In one embodiment, the masked authentication entry may include the authentication code and a plurality of dummy values.

In one embodiment, the method may further include wirelessly transmitting the masked authentication code entry to a point of transaction device.

In one embodiment, the prompt may be displayed in a manner such that it cannot be machine-read by the information processing device.

In one embodiment, the information processing device may be a mobile electronic device, and the masked authentication code may be stored in secure storage of the mobile electronic device.

According to another embodiment, in an information processing device comprising at least one computer processor, a display, and an input device, a method for authentication code entry may include: (1) receiving, over a network and from a mobile electronic device, a request to generate a masking pattern for receiving entry of an authentication code, the masking pattern specifying an order for entering the authentication code; (2) generating the masking pattern; (3) associating the masking pattern with a customer account; and (4) communicating the masking pattern to the mobile electronic device.

In one embodiment, the masking pattern may specify the order of entering values of the authentication code and dummy values in an authentication code entry.

In one embodiment, the masking pattern may be communicated to the mobile electronic device with a prompt for entering the authentication code in accordance with the masking, wherein the prompt is displayed in a manner such that it cannot be machine-read by the information processing device.

In one embodiment, the method may further include receiving, from a point of transaction device, a customer account identifier and a masked authentication code entry received from the mobile electronic device; retrieving the masking pattern for the account associated with the customer account identifier; identifying the authentication code in the masked authentication code entry based on the masking pattern; and validating the authentication code.

In one embodiment, the masked authentication entry may include the authentication code and a plurality of dummy values.

In one embodiment, the method may further include communicating the validation of the authentication code to the point of transaction device.

According to another embodiment, in a point of transaction device comprising at least one computer processor, a method for conducting a transaction using a stored authentication value may include: (1) receiving information for a financial instrument requiring validation of an authentication code to conduct a transaction; (2) receiving, from a computer application executed by a mobile electronic device, a masked authentication code entry comprising authentication values and dummy values, wherein the authentication values are not identified as part of the authentication code; (3) communicating, to a backend for a financial institution associated with the financial instrument, the masked authentication code entry; and (4) receiving, from the backend, approval or denial for the transaction.

In one embodiment, the point of transaction device may prompt the mobile electronic device for the masked authentication code entry.

In one embodiment, the masked authentication code entry may be received wirelessly.

According to another embodiment, a method for entering an authentication code on an electronic device may include: (1) at least one computer processor displaying a prompt on a display of the electronic device to enter a plurality of values in an authentication code and a plurality of dummy values in accordance with an order of entry; (2) the at least one computer processor receiving a response to the prompt comprising the plurality of values in the authentication code and the plurality of dummy values; and (3) the at least one computer processor storing the response to the prompt in memory.

In one embodiment, the method may further include the at least one computer processor verifying that the entered order of the plurality of values in the authentication code and the plurality of dummy values matches the order of entry.

In one embodiment, the order of entry may be received from a back-end.

In one embodiment, the prompt may be displayed in a manner such that it cannot be machine-read by the information processing device.

In one embodiment, the method may further include communicating the response to the prompt to the backend; and receiving validation of the authentication code from the backend.

According to another embodiment, in a point of transaction device comprising at least one computer processor, a method for conducting a transaction using a stored authentication value may include: (1) receiving information for a financial instrument requiring validation of an authentication code to conduct a transaction; (2) receiving, from a computer application executed by a mobile electronic device, authentication values and dummy values, wherein the authentication values are not identified as part of the authentication code; (3) communicating, to a backend for a financial institution associated with the financial instrument, the authentication values and the dummy values; and (4) receiving, from the backend, approval or denial for the transaction.

According to another embodiment, in an information processing device comprising at least one computer processor, a method for conducting a transaction using a stored authentication value may include: (1) receiving, from a point of transaction device, information for a financial instrument requiring validation of an authentication code to conduct a transaction and authentication values and dummy values provided by a mobile electronic device; (2) retrieving a stored masking pattern for the financial instrument; (3) identifying the authentication code from the authentication values and dummy values using the masking pattern; and (4) validating the authentication code and communicating a result of the validation to the point of transaction device.

According to another embodiment, in an information processing device comprising at least one computer processor, a computer application executed by the at least one computer processor, a method for conducting a transaction using a stored authentication value may include: (1) communicating, to a point of transaction device, information for a financial instrument requiring validation of an authentication code to conduct a transaction; (2) receiving, from the point of transaction device, a public key; (3) communicating, to a backend for a financial institution associated with the financial instrument, the public key; (4) receiving, from the backend, a masking pattern encrypted with the public key; and (5) communicating, to the point of transaction device, authentication values and dummy values and the encrypted masking pattern, wherein the authentication values are not identified as part of the authentication code.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Several embodiments of the present invention and their advantages may be understood by referring to FIGS. 1-4.

Embodiments are directed to systems and methods for authentication code entry using mobile electronic devices.

Figure 1:
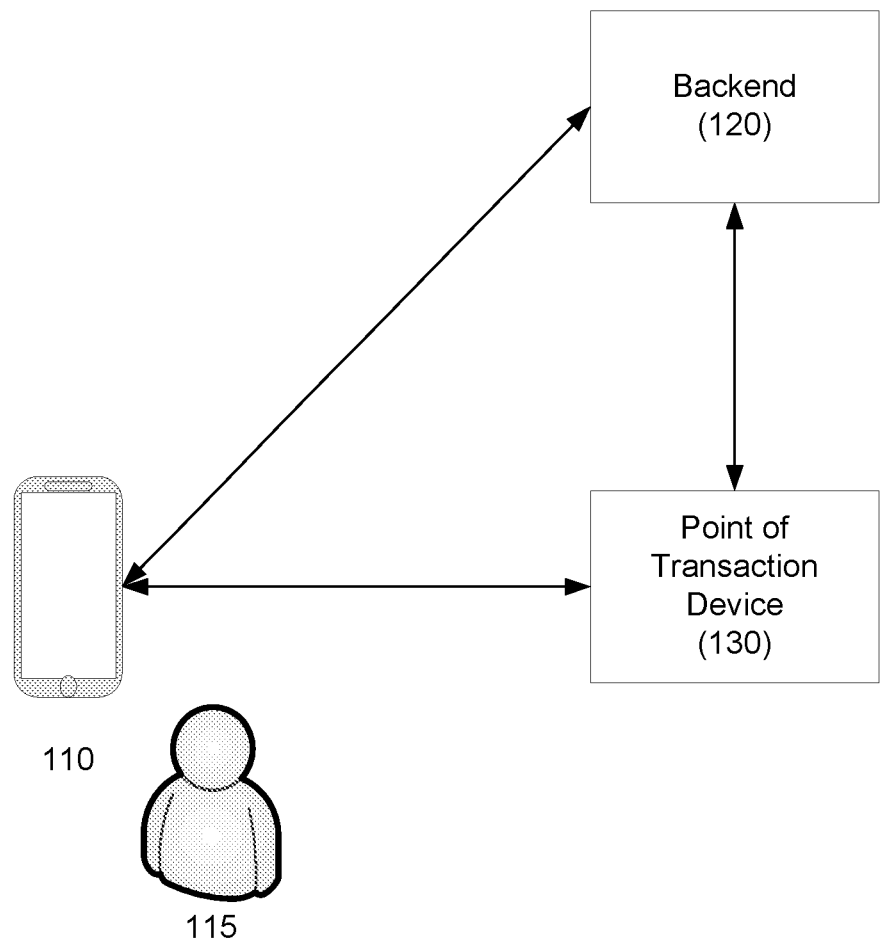
FIG. 1 depicts a system for authentication code entry using mobile electronic devices according to one embodiment.

Referring to FIG. 1, a system for authentication code entry using mobile electronic devices is disclosed according to one embodiment. System 100 may include mobile electronic device 110, backend 120, and merchant point of transaction device 130. Mobile electronic device 110 may be any suitable electronic device, including, for example, notebook/laptop computers, tablet computers, smartphones, Internet of Things (IoT) appliances, smartwatches, etc. In one embodiment, mobile electronic device 110 may execute one or more computer programs or computer applications that may receive and/or store an authentication code, such as a PIN from user 115.

Backend 120 may include one or more servers or computing devices that may be hosted by an issuer of a financial instrument, or a third party associated with the issuer (e.g., an outsourced service), that may be used to conduct a transaction. In one embodiment, backend 120 may be hosted by a credit card issuer, a bank, etc.

Merchant point of transaction device 130 may be any suitable device that receives payment for a transaction from user 115. In one embodiment, point of transaction device 130 may be a point of sale device, an electronic device executing a payment computer application (e.g., a tablet computer, smartphone, etc.). In one embodiment, point of transaction device 130 may include a magnetic stripe reader, an EMV chip reader, an user interface, etc.

Mobile electronic device 110 and backend 120 may communicate with each other using any suitable communication channel, including the Internet. Similarly, backend 120 and point of transaction device 130 may communicate using any suitable communication channel, including the Internet, payment networks, etc.

In one embodiment, mobile electronic device 110 and point of transaction device 130 may communicate using, for example, RF communications (e.g., WiFi, near field communication, Bluetooth), optically, audibly, etc.

Figure 2:
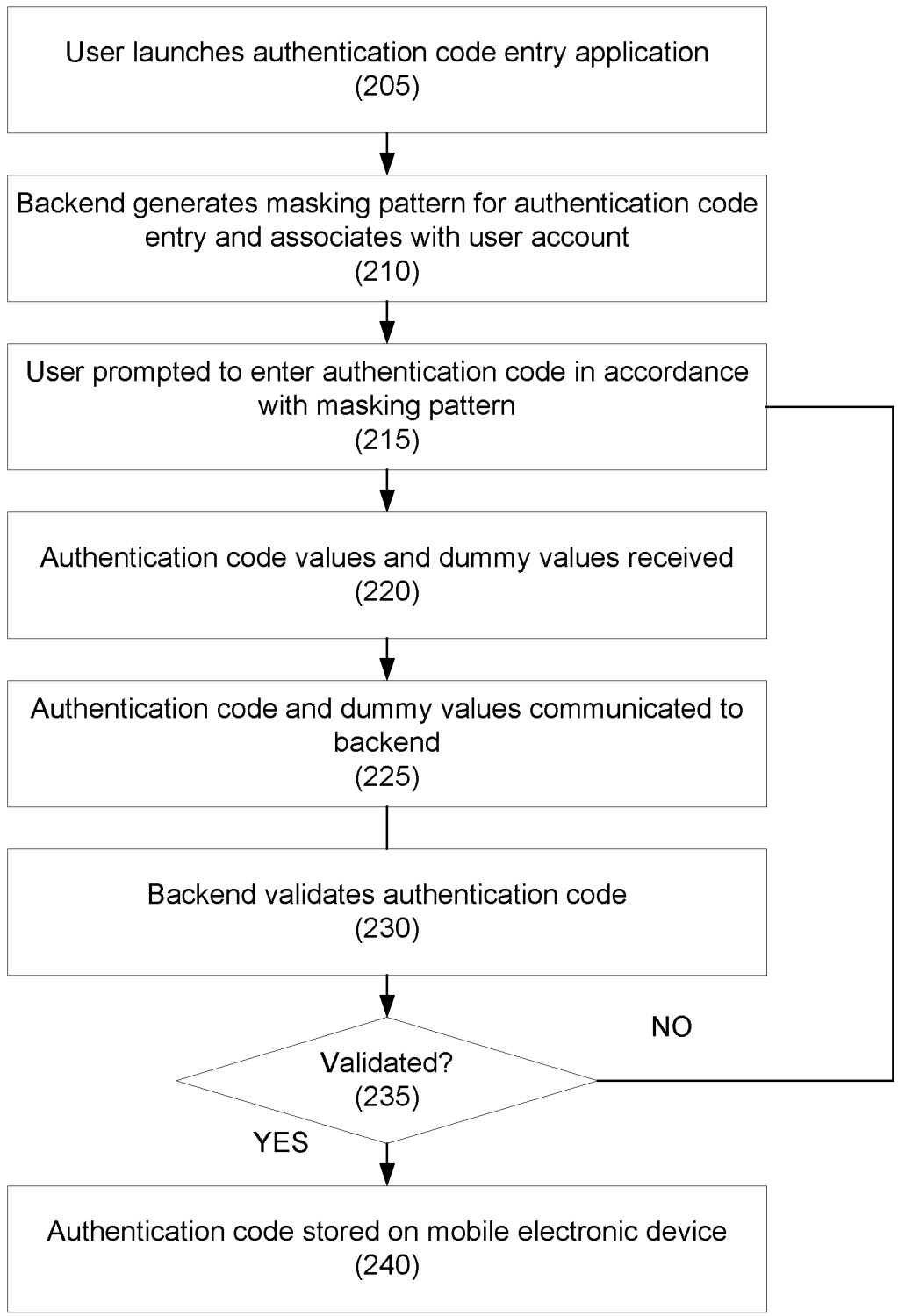
FIG. 2 depicts a method for authentication code entry using mobile electronic devices according to one embodiment.

Referring to FIG. 2, a method for authentication code entry using mobile electronic devices is disclosed according to one embodiment.

In step 205, a user may execute an authentication code entry computer program or application using a mobile electronic device. For example, the authentication code entry application may be provided by the issuer of a financial instrument that may be used to conduct a transaction.

In one embodiment, the user may be authenticated to the application by, for example, providing a user identifier and a password, biometrics, etc.

In one embodiment, the user may request the entry and/or storage of an authentication code via the authentication code entry application, and the authentication code entry application may communicate the request to a backend. In one embodiment, the communication may include user credentials (e.g., user identifier and password, account information, etc.).

In step 210, the backend for the issuer may generate a masking pattern for receiving entry of an authentication code from the use of the mobile electronic device. The masking pattern may include a plurality of placeholders. In one embodiment, the masking pattern may specify an order of entry of the values in the authentication code. It may further specify the order of entry of dummy values. For example, if the authentication code has four values, the masking pattern may specify that the first, third, fourth, and seventh places in an eight value entry may include the values of the authentication code. The remaining places (e.g., the second, fifth, sixth, and eighth places) may contain dummy values.

The number of dummy values may vary as is necessary and/or desired, as may the placement for the authentication values and the dummy values.

In one embodiment, the masking pattern may also re-order the authentication code values. As an illustrative example, the masking pattern may specify that the first authentication code value be entered in the fourth authentication code place, the second authentication code value be entered in the third authentication code place; the third authentication code value be entered in the second authentication code place, and the fourth authentication code value be entered in the first authentication code place.

In one embodiment, the backend may store the masking pattern and may associate the masking pattern with the user. It may then communicate the masking pattern to the user.

In step 215, the user may be prompted by the authentication code entry application to enter the authentication code according to the masking pattern. For example, the user may be presented with eight entry spaces, and may be instructed to enter the authentication code values in the first, third, fourth, and seventh places, and to enter dummy values in the second, fifth, sixth, and eighth places.

In one embodiment, the prompt may be presented in a manner that cannot be read or interpreted by a machine. For example, the user may be presented with one or more images of numbers associated with the values in a manner similar to CAPTCHA prompts. The images may include numbers of different fonts, sizes, orientations, colors, darkness, hue, focus, line quality, etc. in order to prevent machine reading.

Thus, in one embodiment, the authentication code entry application does not know what places contain the authentication code values, and what spaces contain the dummy values.

In step 220, the user may enter the authentication code values and dummy values in accordance with the prompt, and, in step 225, the authentication code values and the dummy values may be communicated to the backend.

In step 230, the backend, using the stored masking pattern, may identify the authentication code values from the received authentication code values and the dummy values, and may validate the authentication code. If, in step 235, the authentication code is validated, in step 240, the backend may instruct the authentication code entry application to store the authentication code values and dummy values that were entered. In one embodiment, the authentication code values and dummy values may be stored in device memory, in a secure element, in the cloud, etc.

If the authentication code is not validated, the backend may instruct the authentication code entry application to repeat the entry.

In one embodiment, after a predetermined number of unsuccessful validations, the user may be re-authenticated, the user's account may be locked, the backend may generate a new masking pattern, or any other suitable action may be taken.

In one embodiment, the stored authentication code values and dummy values and/or the masking pattern may expire after a predetermined event. For example, the backend may expire the masking pattern after a certain number of transactions, after a period of time, after a certain amount is spent, etc.

In one embodiment, the authentication value entry may be performed remotely from a merchant, and in advance of a transaction.

Figure 3:
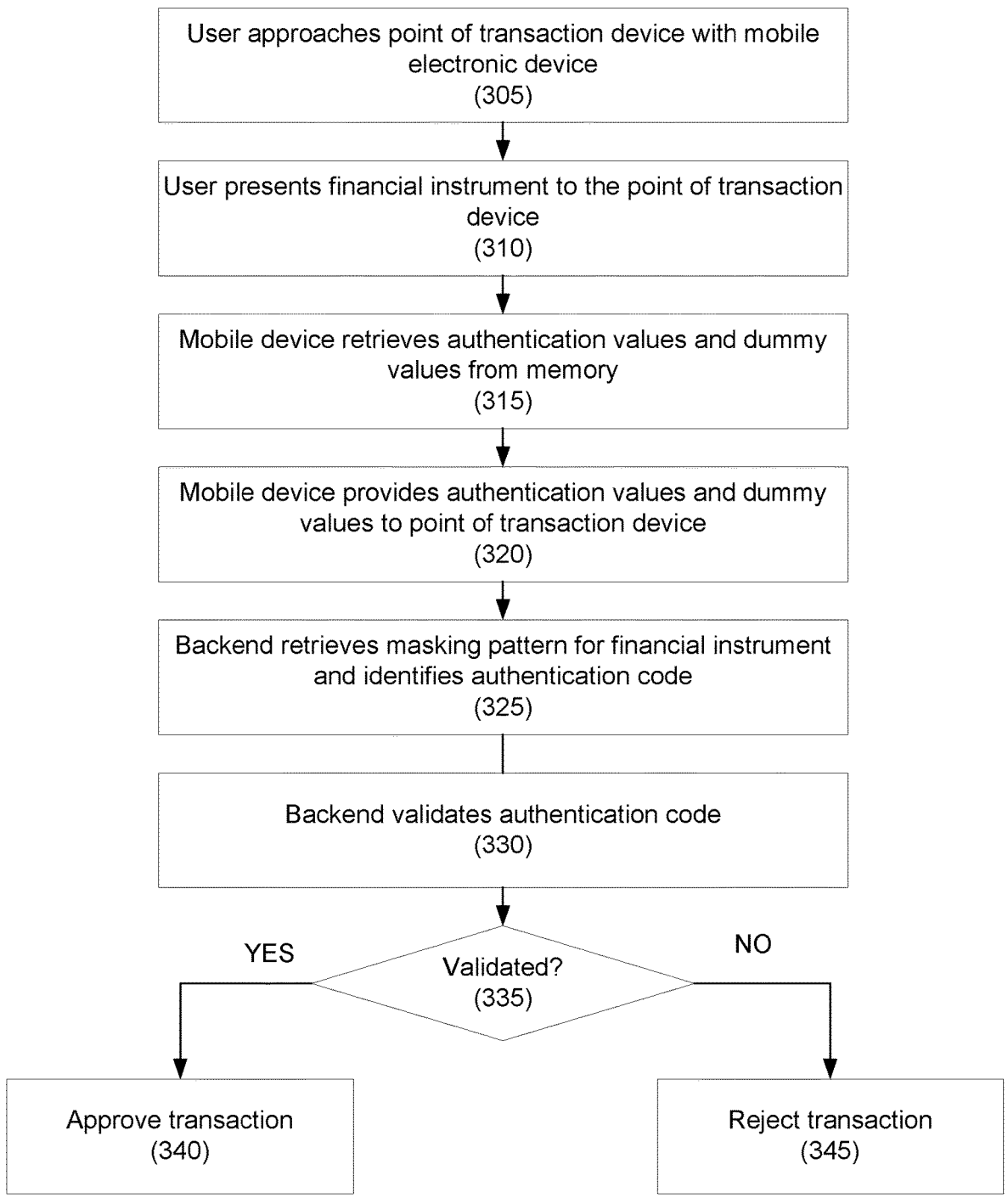
FIG. 3 depicts a method for conducting a transaction with authentication code entry using mobile electronic devices according to one embodiment.

Referring to FIG. 3, a method for conducting a transaction with authentication code entry using mobile electronic devices is disclosed according to one embodiment.

In step 305, a user may approach a merchant point of transaction device with a mobile electronic device that has authentication code values and dummy values that were entered in accordance with a masking pattern stored in the memory thereof.

In step 310, the user may present a financial instrument (e.g., credit card, debit card, token, etc.) to the point of transaction device. In one embodiment, the financial instrument may be physically presented; in another embodiment, the financial instrument may be communicated by RF communication, optical communication, etc.

In one embodiment, the point of transaction device may communicate a request for authenticating information to the mobile electronic device. In one embodiment, the point of transaction device may communicate the request to a computer program or application executed by the mobile electronic device, such as an authentication code entry application.

In step 315, the computer application may retrieve the authentication code values and the dummy values from memory, and may communicate the authentication code values and dummy values to the point of transaction device.

In one embodiment, if the mobile electronic device does not have the stored authentication code values and dummy values, or if the stored authentication code values and dummy values have expired, the computer application may conduct the process of entering the authentication code values and dummy values as detailed above.

In one embodiment, if the financial instrument information was communicated as a token, the authentication code values and dummy values may be communicated therewith.

In step 320, the point of transaction device may communicate the authentication code values and dummy values to a backend for a financial institution associated with the financial instrument.

In step 325, the backend may retrieve the masking pattern associated with the financial instrument and, using the stored masking pattern, may identify the authentication code values from the received authentication code values and the dummy values, and, in step 330, may validate the authentication code. If, in step 335, the authentication code is validated, in step 340, the backend may instruct the point of transaction device that the transaction is approved.

If the authentication code is not validated, in step 345, the backend may instruct the point of transaction device that the transaction is denied.

In one embodiment, the backend may notify the user associated with the financial instrument that the authentication code was rejected, and may take any appropriate action as is necessary and/or desired (e.g., lock the account, expire the masking pattern, etc.).

Figure 4:
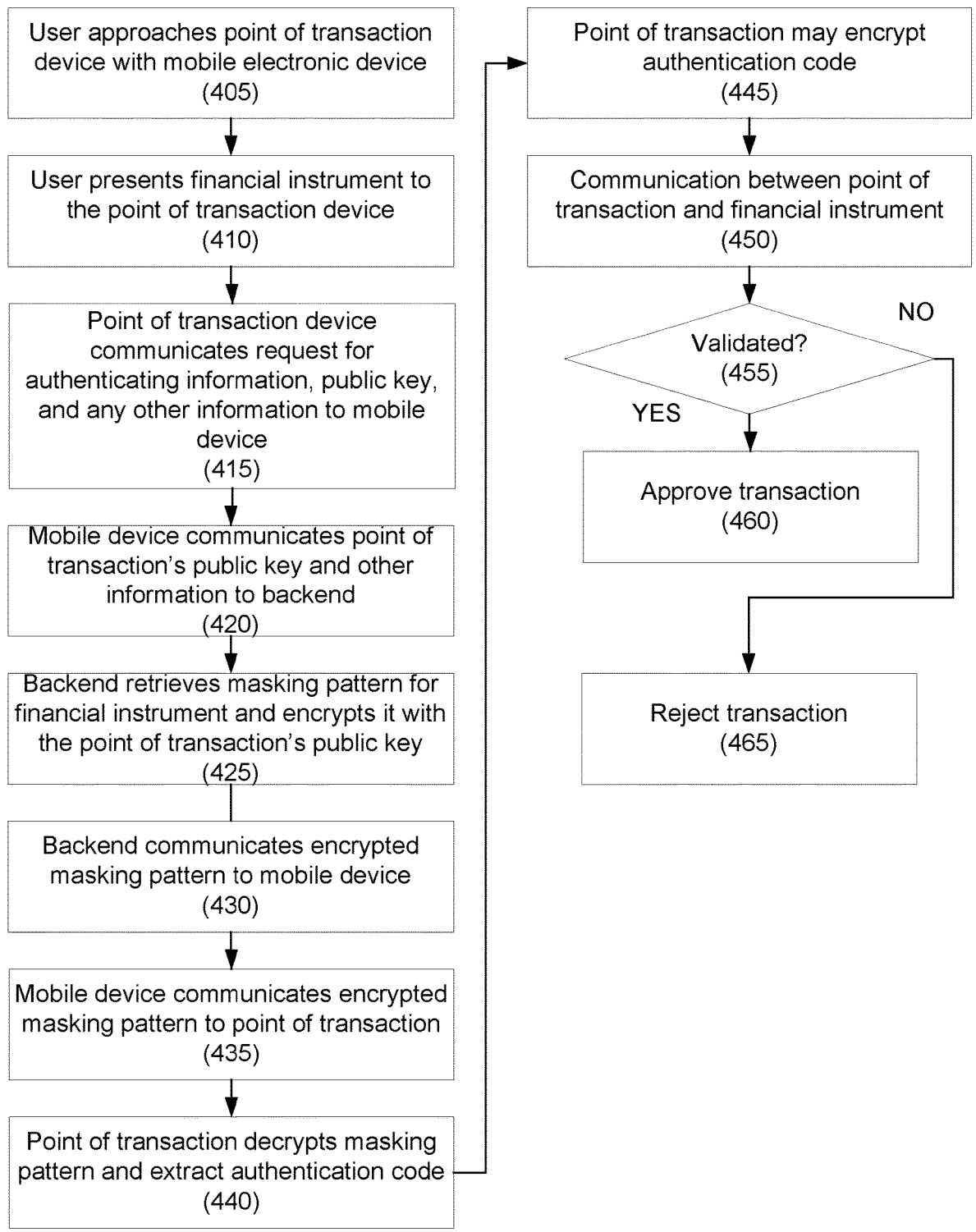
FIG. 4 depicts a method for conducting an offline transaction with authentication code entry using mobile electronic devices according to another embodiment.

In another embodiment, the backend may not be available to validate the authentication code. Referring to FIG. 4, a method for conducting an offline transaction with authentication code entry using mobile electronic devices according to another embodiment.

In step 405, a user may approach a merchant point of transaction device with a mobile electronic device that has authentication code values and dummy values that were entered in accordance with a masking pattern stored in the memory thereof.

In step 410, the user may present a financial instrument (e.g., credit card, debit card, token, etc.) to the point of transaction device. In one embodiment, the financial instrument may be physically presented; in another embodiment, the financial instrument may be communicated by RF communication, optical communication, etc.

In one embodiment, the financial instrument may be an EMV card. The EMV card may have an authentication code stored thereon. In another embodiment, the EMV card may not have the authentication code stored thereon, but may verify the authentication code using, for example, a stored hash of the authentication code.

In one embodiment, the authentication code may be cryptographically protected.

In step 415, the point of transaction device may communicate a request for authenticating information to the mobile electronic device, for example, to a computer application executed by the mobile electronic device. In one embodiment, the point of transaction device may communicate the request to a computer program or application executed by the mobile electronic device, such as an authentication code entry application.

In one embodiment, if the point of transaction device is not in communication with a backend for the financial institution associated with the financial instrument, it may further provide its public key and any other necessary information to the computer application executed by a mobile electronic device. In one embodiment, the public key may be the point of transaction's Secure Card Reader for PIN, or SCRP, public key. Additional information, such as a serial number or identification number for the point of transaction, merchant information, etc. may be provided as is necessary and/or desired.

In step 420, the computer application may communicate the point of transaction's public key and other information to the backend for the financial institution associated with the financial instrument.

In step 425, the backed may retrieve and encrypt the masking pattern with the point of transaction's public key, and, in step 430, may communicate the encrypted masking pattern to the computer application.

In step 435, the computer application may communicate the authentication values and dummy values, and the encrypted masking pattern, to the point of transaction device.

In step 440, the point of transaction device may decrypt the masking pattern and use the masking pattern to extract the authentication code from the authentication values and dummy values.

In step 445, the authentication code may optionally be encrypted as is necessary and/or desired for the financial instrument (e.g., the EMV card).

In step 450, the point of transaction device may communicate the plaintext authentication code, or the encrypted authentication code, to the financial instrument. Alternatively, the financial instrument may communicate a stored authentication code, or a stored hash or other cryptographically-processed version of the authentication code, to the point of transaction device. The stored authentication code, or a stored hash or other cryptographically-processed version of the authentication code may optionally be encrypted for communication as is necessary and/or desired.

In one embodiment, the financial instrument may provide the function, or an identification of the function, that was used to generate the hash or other cryptographically-processed version of the authentication code that may be stored on the financial instrument.

In step 455, offline authentication code validation may be performed between the financial instrument (e.g., the EMV card) and the point of transaction device. In one embodiment, the authentication code may be stored on the financial instrument, and the financial instrument may verify the authentication code. In another embodiment, a hash or other cryptographically-processed version of the authentication code may be stored on the financial instrument, and the financial instrument may verify the authentication code against the stored cryptographically-processed version of the authentication code.

Alternatively, in another embodiment, the point of transaction device may then verify the authentication code against the received authentication code or the hash or other cryptographically-processed version of the authentication code. In one embodiment, the point of transaction device may generate a hash or other cryptographically-generated version of the decrypted authentication code using the function received or identified by the financial instrument.

Other ways of verifying the authentication code may be used as is necessary and/or desired.

If, the authentication code is validated, in step 460, the transaction may be approved. If the authentication code is not validated, in step 465, the transaction may be denied.

It will be appreciated by persons skilled in the art that the present invention is not limited by what has been particularly shown and described hereinabove. Rather the scope of the present invention includes both combinations and sub-combinations of features described hereinabove and variations and modifications thereof which are not in the prior art. It should further be recognized that these embodiments are not exclusive to each other.

It will be readily understood by those persons skilled in the art that the embodiments disclosed here are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for authentication code entry using a mobile electronic device for a user to conduct a transaction at a point of transaction device, comprising:
   receiving, at a backend server comprising a backend computer processor over a network and from the mobile electronic device, a request from the user for entry and storage of an authentication code for a financial instrument for the transaction;
   generating, by the backend server, a masking pattern that specifies an order of entering digits of the authentication code for the financial instrument, the masking pattern comprising a plurality of placeholders for the digits of the authentication code, and the order of entering digits of the authentication code specifies a first subset of the plurality of placeholders that receive the digits of the authentication code and a second subset of the plurality of placeholders that receive dummy digits;
   associating and storing, by the backend server, the masking pattern with an account identifier for the financial instrument;
   in response to receiving the request from the mobile electronic device, communicating, by the backend server, the associated masking pattern to the mobile electronic device with a prompt comprising a non-machine readable instruction to enter the digits of the authentication code in accordance with the associated masking pattern;
   in response to a masked authentication code entry entered at the mobile electronic device in accordance with the prompt, stored in a memory of the mobile electronic device and wirelessly communicated to the point of transaction device, receiving, by the backend server, the account identifier for the financial instrument and the masked authentication code entry from the point of transaction device;
   retrieving, by the backend server, the associated masking pattern for the financial instrument based on the received account identifier;
   identifying, by the backend server, the digits of the authentication code in the masked authentication code entry using the retrieved associated masking pattern;
   validating, by the backend server, the digits of the authentication code; and
   communicating, by the backend server, the validation to the point of transaction device.

2. The method of claim 1, wherein the mobile electronic device is configured to display the non-machine readable instruction such that it cannot be machine-read by any application executed by the mobile electronic device.

3. The method of claim 2, wherein the non-machine readable instruction is displayed as a CAPTCHA.

4. The method of claim 2, wherein the non-machine readable instruction is displayed as one or more images.

5. The method of claim 1, further comprising:
   expiring, by the backend server, the masking pattern.

6. A non-transitory computer readable medium having stored thereon software instructions that, when executed by a computer processor in a backend server, cause the computer processor to execute steps comprising:
   receive, from a mobile electronic device, a request for entry and storage of an authentication code for a financial instrument for a transaction at a point of transaction device;
   generate a masking pattern that specifies an order of entering digits of the authentication code for the financial instrument, the masking pattern comprising a plurality of placeholders for the digits of the authentication code, and the order of entering digits of the authentication code specifies a first subset of the plurality of placeholders that receive the digits of the authentication code and a second subset of the plurality of placeholders that receive dummy digits;
   associate and store the masking pattern with an account identifier for the financial instrument;
   in response to the received request from the mobile electronic device, communicate the associated masking pattern to the mobile electronic device with a prompt comprising a non-machine readable instruction to enter the digits of the authentication code in accordance with the associated masking pattern;
   in response to a masked authentication code entry entered at the mobile electronic device in accordance with the prompt, stored in a memory of the mobile electronic device and wirelessly communicated to the point of transaction device, receive the account identifier for the financial instrument and the masked authentication code entry from the point of transaction device;
   retrieve the associated masking pattern for the financial instrument based on the received account identifier;
   identify the digits of the authentication code in the masked authentication code entry using the retrieved associated masking pattern;
   validate the digits of the authentication code; and
   communicate the validation to the point of transaction device.

7. The non-transitory computer readable medium of claim 6, wherein the mobile electronic device is configured to display the non-machine readable instruction such that it cannot be machine-read by any application executed by the mobile electronic device.

8. The non-transitory computer readable medium of claim 7, wherein the non-machine readable instruction is displayed as a CAPTCHA.

9. The non-transitory computer readable medium of claim 7, wherein the non-machine readable instruction is displayed as one or more images.

10. The non-transitory computer readable medium of claim 6, further comprising software instructions that, when executed by the computer processor in the backend server, cause the computer processor to expire the masking pattern.

11. A backend server, comprising:
    a computer processor; and
    a memory storing a backend computer program;
    wherein the backend computer program is configured to:
    receive, from a mobile electronic device, a request for entry and storage of an authentication code for a financial instrument for a transaction at a point of transaction device;
    generate a masking pattern that specifies an order of entering digits of the authentication code for the financial instrument, the masking pattern comprising a plurality of placeholders for the digits of the authentication code, and the order of entering digits of the authentication code specifies a first subset of the plurality of placeholders that receive the digits of the authentication code and a second subset of the plurality of placeholders that receive dummy digits;
    associate and store the masking pattern with an account identifier for the financial instrument;

in response to receiving the request from the mobile electronic device, communicate the associated masking pattern to the mobile electronic device with a prompt comprising a non-machine readable instruction to enter the digits of the authentication code in accordance with the associated masking pattern;

in response to a masked authentication code entry entered at the mobile electronic device in accordance with the prompt, stored in a memory of the mobile electronic device and wirelessly communicated to the point of transaction device, receive the account identifier for the financial instrument and the masked authentication code entry from the point of transaction device;

retrieve the associated masking pattern for the financial instrument based on the received account identifier;

identify the digits of the authentication code in the masked authentication code entry using the retrieved associated masking pattern;

validate the digits of the authentication code; and communicate the validation to the point of transaction device.

12. The backend server of claim 11, wherein the mobile electronic device is configured to display the non-machine readable instruction such that it cannot be machine-read by any application executed by the mobile electronic device.

13. The backend server of claim 12, wherein the non-machine readable instruction is displayed as a CAPTCHA.

14. The backend server of claim 12, wherein the non-machine readable instruction is displayed as one or more images.

15. The backend server of claim 11, wherein the backend computer program further is configured to expire the masking pattern.

* * * * *